(12) United States Patent  (10) Patent No.: US 9,160,542 B2
Dasari et al.  (45) Date of Patent: Oct. 13, 2015

(54) AUTHORIZING USE OF A TEST KEY SIGNED BUILD

(71) Applicant: INTERNATIONAL BUSINESS MACHINES CORPORATION, Armonk, NY (US)

(72) Inventors: Shiva R. Dasari, Austin, TX (US); Lee H. Wilson, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 143 days.

(21) Appl. No.: 13/845,798

(22) Filed: Mar. 18, 2013

(65) Prior Publication Data

US 2014/0281504 A1    Sep. 18, 2014

(51) Int. Cl.
*H04L 9/32*  (2006.01)
*H04L 9/08*  (2006.01)
*G06F 21/57*  (2013.01)

(52) U.S. Cl.
CPC ............ *H04L 9/3268* (2013.01); *G06F 21/572* (2013.01); *H04L 9/0825* (2013.01); *H04L 2209/127* (2013.01)

(58) Field of Classification Search
CPC ................ H04L 9/3268; H04L 9/0825; H04L 2209/127
See application file for complete search history.

(56) References Cited

U.S. PATENT DOCUMENTS

| | | | |
|---|---|---|---|
| 5,956,408 A * | 9/1999 | Arnold ........................... | 713/189 |
| 7,017,040 B2 | 3/2006 | Singer et al. | |
| 7,904,708 B2 | 3/2011 | Harmer | |
| 7,984,286 B2 | 7/2011 | Zimmer et al. | |
| 2005/0021968 A1 * | 1/2005 | Zimmer et al. ............... | 713/176 |
| 2008/0040495 A1 * | 2/2008 | Adams et al. .................. | 709/230 |
| 2010/0017659 A1 * | 1/2010 | Dos Remedios ................ | 714/36 |
| 2010/0077199 A1 | 3/2010 | Hobson et al. | |
| 2010/0161998 A1 | 6/2010 | Chen et al. | |
| 2011/0099627 A1 * | 4/2011 | Proudler ......................... | 726/21 |
| 2011/0154009 A1 | 6/2011 | Harmer | |
| 2011/0154010 A1 | 6/2011 | Springfield et al. | |
| 2011/0307712 A1 | 12/2011 | Sakthikumar et al. | |
| 2012/0079100 A1 * | 3/2012 | McIntyre et al. ............. | 709/224 |
| 2012/0151223 A1 | 6/2012 | Conde Marques et al. | |

(Continued)

OTHER PUBLICATIONS

Disclosed Anonymously; "Method to Securely Move BIOS From High Security to Low Security Mode and Vice Versa", IP.com Prior Art Database, IPCOM000213625D, Dec. 22, 2011, pp. 1-4, USA.

(Continued)

*Primary Examiner* — Matthew Henning
(74) *Attorney, Agent, or Firm* — Edward J. Lenart; Katherine S. Brown; Kennedy Lenart Spraggins LLP

(57) ABSTRACT

Methods, apparatuses, and computer program products for authorizing use of a test key signed build are provided. Embodiments include transmitting to an update provider system, unique data associated with a target system; receiving from the update provider system, a signed update capsule file; determining, by the target system, that a signature within the signed update capsule file is valid; in response to determining that the signature is valid, determining that the validation data within the signed update capsule file matches the unique data associated with the target system; and in response to determining that the validation data matches the unique data, determining that the target system is authorized to use a test key signed build to update the firmware of the target system.

19 Claims, 3 Drawing Sheets

(56) References Cited

U.S. PATENT DOCUMENTS

2012/0173885 A1    7/2012  Acar et al.
2012/0303310 A1*  11/2012  Musfeldt .................... 702/123
2013/0185563 A1*   7/2013  Djabarov et al. ............ 713/176
2014/0095886 A1*   4/2014  Futral ......................... 713/187

OTHER PUBLICATIONS

Gallo et al.; "T-DRE: A Hardware Trusted Computing Base for Direct Recording Electronic Vote Machines", Proceedings of the 26$^{th}$ Annual Computer Security Applications Conference (ACSAC'10), Dec. 2010, pp. 191-198, Association for Computing Machinery (ACM), New York, NY, USA, ISBN No. 978-1-4503-0133-6.

* cited by examiner

AUTHORIZING USE OF A TEST KEY SIGNED BUILD

BACKGROUND OF THE INVENTION

1. Field of the Invention

The field of the invention is data processing, or, more specifically, methods, apparatuses, and computer program products for authorizing use of a test key signed build.

2. Description of Related Art

One of the requirements for Trusted Computing Group's (TCG) Core Root of Trust for Measurement (CRTM) is that it must be immutable. If allowed to update it must be updatable under manufacturer controlled environment. One of the ways to achieve this is to: sign an incoming image; digital signature validate the incoming image; and the CRTM code updates itself after successful validation of the digital signature. To control this process, server platform vendors typically sign the incoming image using their public-private key pair (called production keys) and store the public key in the secure area of the BIOS. In this example, the systems only accept production key signed builds. However, there are occasions that code developers may wish a client system to transition from a production key signed built to a test key signed (or unsigned) build, such as during a debugging process.

SUMMARY OF THE INVENTION

Methods, apparatuses, and computer program products for authorizing use of a test key signed build are provided. Embodiments include transmitting to an update provider system, unique data associated with a target system; receiving from the update provider system, a signed update capsule file; determining, by the target system, that a signature within the signed update capsule file is valid; in response to determining that the signature is valid, determining that the validation data within the signed update capsule file matches the unique data associated with the target system; and in response to determining that the validation data matches the unique data, determining that the target system is authorized to use a test key signed build to update the firmware of the target system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
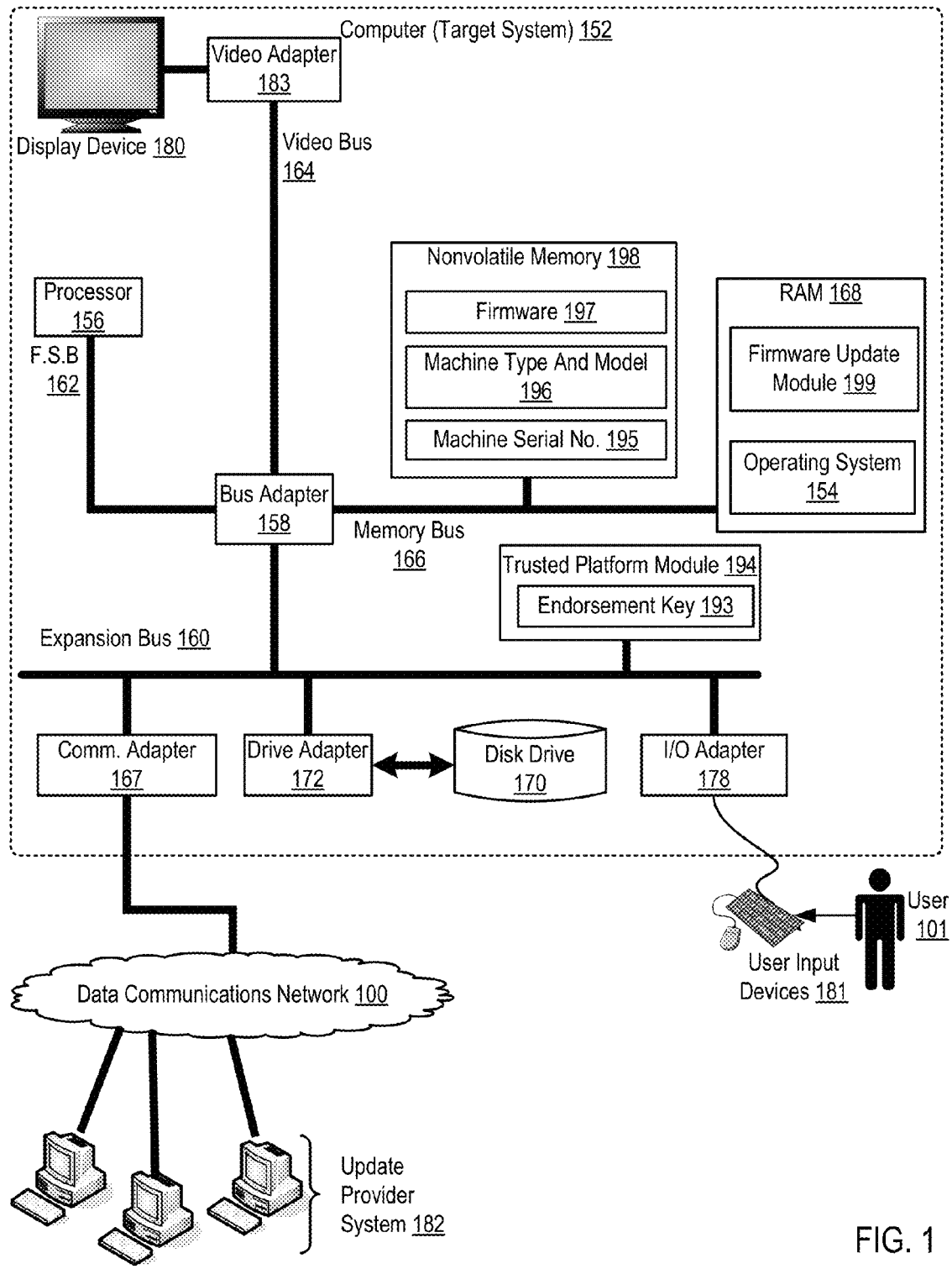
FIG. 1 sets forth a block diagram of automated computing machinery comprising an exemplary computer useful in authorizing use of a test key signed build according to embodiments of the present invention.

Exemplary methods, apparatuses, and computer program products for authorizing use of a test key signed build in accordance with the present invention are described with reference to the accompanying drawings, beginning with FIG. 1. Authorizing use of a test key signed build in accordance with the present invention is generally implemented with computers, that is, with automated computing machinery. FIG. 1 sets forth a block diagram of automated computing machinery comprising an exemplary computer (152) useful in authorizing use of a test key signed build according to embodiments of the present invention. The computer (152) of FIG. 1 includes at least one computer processor (156) or 'CPU' as well as random access memory (168) ('RAM') and non-volatile memory (198), both of which are connected through a high speed memory bus (166) and bus adapter (158) to the processor (156) and to other components of the computer (152).

Stored in the non-volatile memory (198) is firmware (197). Firmware is a combination of persistent memory and program code and data stored in it. Examples of firmware include BIOS and CRTM. The computer (152) of FIG. 1 also includes a trusted platform module (TPM) (194). A TPM may include facilities for the secure generation of cryptographic keys, and limitation of their use, in addition to a random number generator. A TPM may also include capabilities such as remote attestation and sealed storage. Remote attestation creates a nearly unforgettable hash-key summary of the hardware and software configuration. A TPM binding module encrypts data using the TPM endorsement key (EK). An EK is a unique RSA key burned into the chip during its production. Sealing encrypts data in similar manner to binding, but in addition specifies a state in which the TPM must be in order for the data to be decrypted (unsealed).

In addition, TPM can be used to authenticate hardware devices. For example, because each TPM chip has a unique and secret RSA key burned in as it is produced, it is capable of performing platform authentication. According to embodiments of the present invention, the EK may be used as identifying data that is unique to the target system. In the example of FIG. 1, the non-volatile memory (198) also includes other unique data associated with the target system, for example, a machine type and model number (196) and a machine serial number (195). The firmware (197), the machine type and model number (196) and the machine serial number (195) in the example of FIG. 1 are shown in the non-volatile memory (198), but many components of such software may be stored in other data storage locations, such as flash memory (not shown) or a disk drive (170).

Stored in RAM (168) is a firmware update module (199) for authorizing use of a test key signed build according to embodiments of the present invention. Specifically, the firmware update module (199) includes computer program instructions that when executed by the computer processor (156) cause the computer (152) to carry out the steps of: transmitting to an update provider system (182), unique data associated with the target system (152). The firmware update module (199) is also configured to receive from the update provider system (182), a signed update capsule file. The firmware update module (199) is also configured to determine that a signature within the signed update capsule file is valid and in response to determining that the signature is valid, determining that the validation data within the signed update capsule file matches the unique data associated with the target system. For example, the validation data within the signed update capsule file may be EK data (unique data) from the target system. In response to determining that the validation data matches the unique data, the firmware update module (199) is configured to determine that the target system (152) is authorized to use the test key signed build to update the firmware (197) of the target system (152). That is, a valid signed update capsule file acts as an authorization ticket to transition from use of production key signed builds to test key signed builds.

Also stored in RAM (168) is an operating system (154). Operating systems useful authorizing use of a test key signed build according to embodiments of the present invention include UNIX™ Linux™ Microsoft XP™ AIX™ IBM's i5/OS™ and others as will occur to those of skill in the art. The operating system (154) and the firmware update module (199) in the example of FIG. 1 are shown in RAM (168), but many components of such software typically are stored in other data stored locations, such as the disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for authorizing use of a test key signed build according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with the update provider system (182) and for data communications with a data communications network (100). An update provider system may include one or more servers that are configured to receive unique data from one or more target systems; generate update capsule files for each target system; sign the update capsule files; and transmit the signed update capsule files to the target systems. For example, the update provider system may include a signing server that uses a private production key to sign the update capsule files. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for authorizing use of a test key signed build according to embodiments of the present invention include modems for wired dial-up communications, Ethernet (IEEE 802.3) adapters for wired data communications network communications, and 802.11 adapters for wireless data communications network communications.

Figure 2:
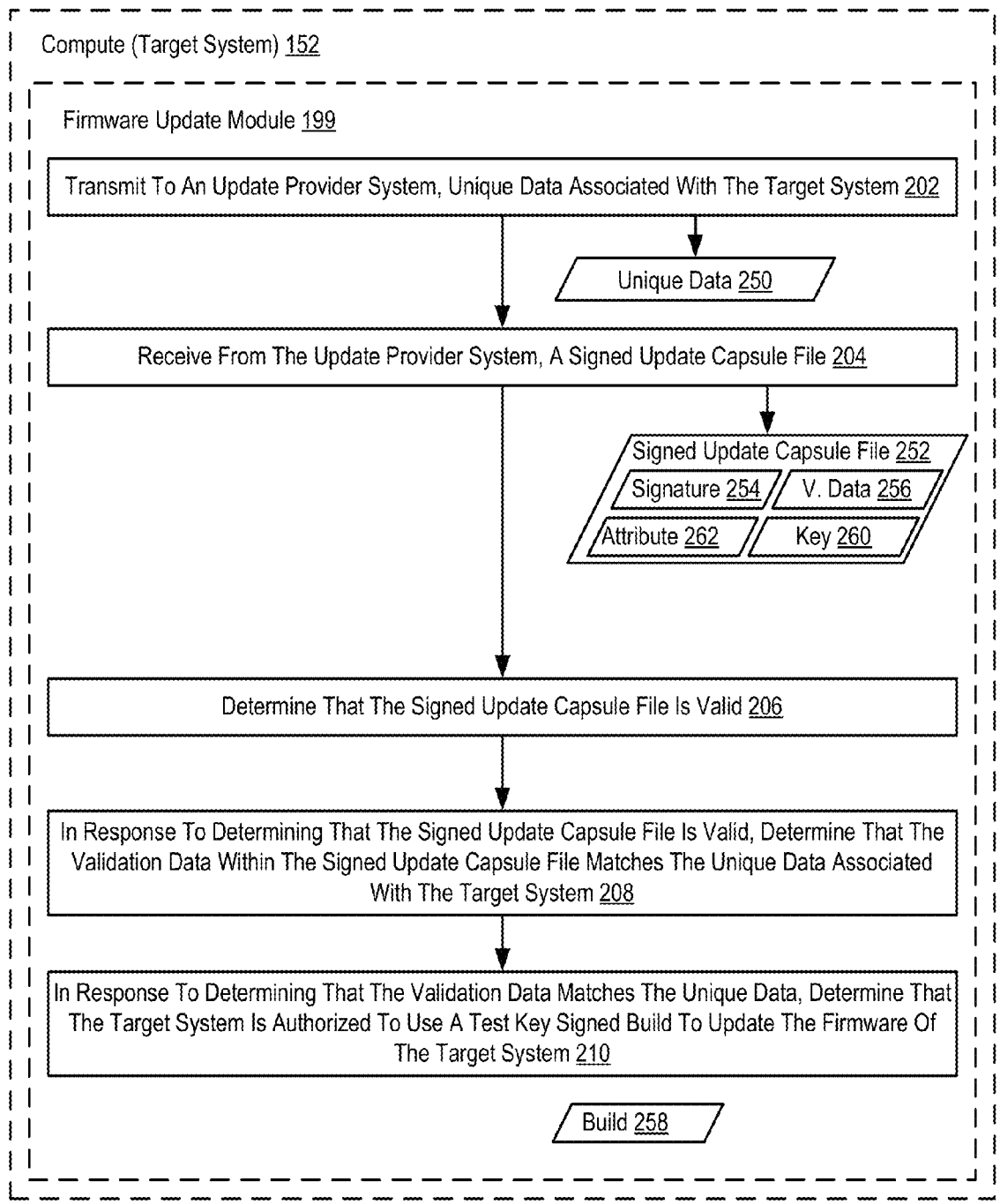
FIG. 2 sets forth a flow chart illustrating an exemplary method for authorizing use of a test key signed build according to embodiments of the present invention.

For further explanation, FIG. 2 sets forth a flow chart illustrating an exemplary method for authorizing use of a test key signed build according to embodiments of the present invention. For ease of explanation the component of FIG. 1 are referenced in the description of FIG. 2.

The method of FIG. 2 includes a target system (152) transmitting (202) to an update provider system (182) unique data (250) associated with the target system (152). In a particular embodiment, the unique data includes at least one of an Trusted Platform Module (TPM) Endorsement Key (EK) (193), a Machine Serial Number (MSN) (195), and a Machine Type and Model Number (MTM) (196). Transmitting (202) to an update provider system (182) unique data (250) associated with the target system (152) may be carried out by transmitting the unique data by a variety of communication methods, including for example, by email or by the update provider system logging-in to the target system (152).

The method of FIG. 2 also includes the target system (152) receiving (204) from the update provider system (182) a signed update capsule file (252). Receiving (204) from the update provider system (182) a signed update capsule file (252) may be carried out by receiving the signed update capsule file by a variety of communication methods, including for example by email or directly through a port of the computer (152). For example, a user of the computer (152) may plug into a port of the computer (152) a USB device storing the signed update capsule file.

In the example of FIG. 2, the signed update capsule file (252) includes a signature (254) for validating the signed update capsule file (252). A signature is generated by a signing server of the update provider system (182) using a private production key. The signed update capsule file (252) also includes validation data (256) for comparing with the unique data (250) of the target system (152). In a particular embodiment, the update provider system (182) takes the unique data (250) received from the target system (152) and places the unique data (250) into the header of the signed update capsule file (250), as the validation data (256).

As explained above, developers may have many reasons for wanting a target system to accept a test key signed build instead of only production key signed builds. For example, when new systems are received from manufacturing for life cycle tests, a test team typically require these systems to be transitioned to test key signed builds. As another example, developers may want to put back in service the systems that were used to test production key signed builds and thus need the systems to accept test key signed builds. The signed update capsule file (252) also includes a public test key (260) for decrypting a test key signed build (258). A test key signed build is a firmware build that is signed by a test key instead of a production key. In this example, the test key signed build (258) may be encrypted by the update provider system (182) using a private test key.

In a particular embodiment, the signed update capsule file (258) includes a fixed use attribute (262). A fixed use attribute limits use of the test key signed build (258). For example, the fixed use attribute may limit the test key signed build to one time, multiple uses, to a particular expiration date, and many other limitations as will occur to readers of skill in the art. That is, the fixed use attribute specifies the limitations of the authorization to use test key signed builds. For example, a developer may wish a particular system to be accept test key signed builds for only a limited time period, such as when the targets system is being debugged, to limit the vulnerability period of the firmware (197).

The method of FIG. 2 also includes the target system (152) determining (206) that the signed update capsule file (252) is valid. Determining (206) that the signed update capsule file (252) is valid may be carried out by verifying the signature using public production key stored within firmware. That is, the signature (254) acts to authenticate that the signed update capsule file is from the update provider system (182).

The method of FIG. 2 also includes the target system (152) determining (208), in response to determining (206) that the signed update capsule file (252) is valid, that the validation data (256) within the signed update capsule file (252) matches the unique data (250) associated with the target system (152). Determining (208), in response to determining (206) that the signed update capsule is valid, that the validation data (256) within the signed update capsule file (252) matches the unique data (250) associated with the target system (152) may be carried out by comparing EK numbers, MTM numbers, MSN numbers, any other type of data unique to the target system. That is, the validation data acts as an additional layer of security to confirm that the update is for the particular target system.

The method of FIG. 2 also includes the target system (152) determining (210), in response to determining (208) that the validation data (256) matches the unique data (250), that the target system (152) is authorized to use the test key signed build (258) to update the firmware (197) of the target system (152). Determining (210), in response to determining (208) that the validation data (256) matches the unique data (250), that the target system (152) is authorized to use the test key signed build (258) to update the firmware (197) of the target system (152) may be carried out by loading the test key signed build (258) into the target system. That is, the signature confirms that the capsule file is from the update provider system and the validation data confirms that the update provider system has authorized the use of the test key signed build.

Figure 3:
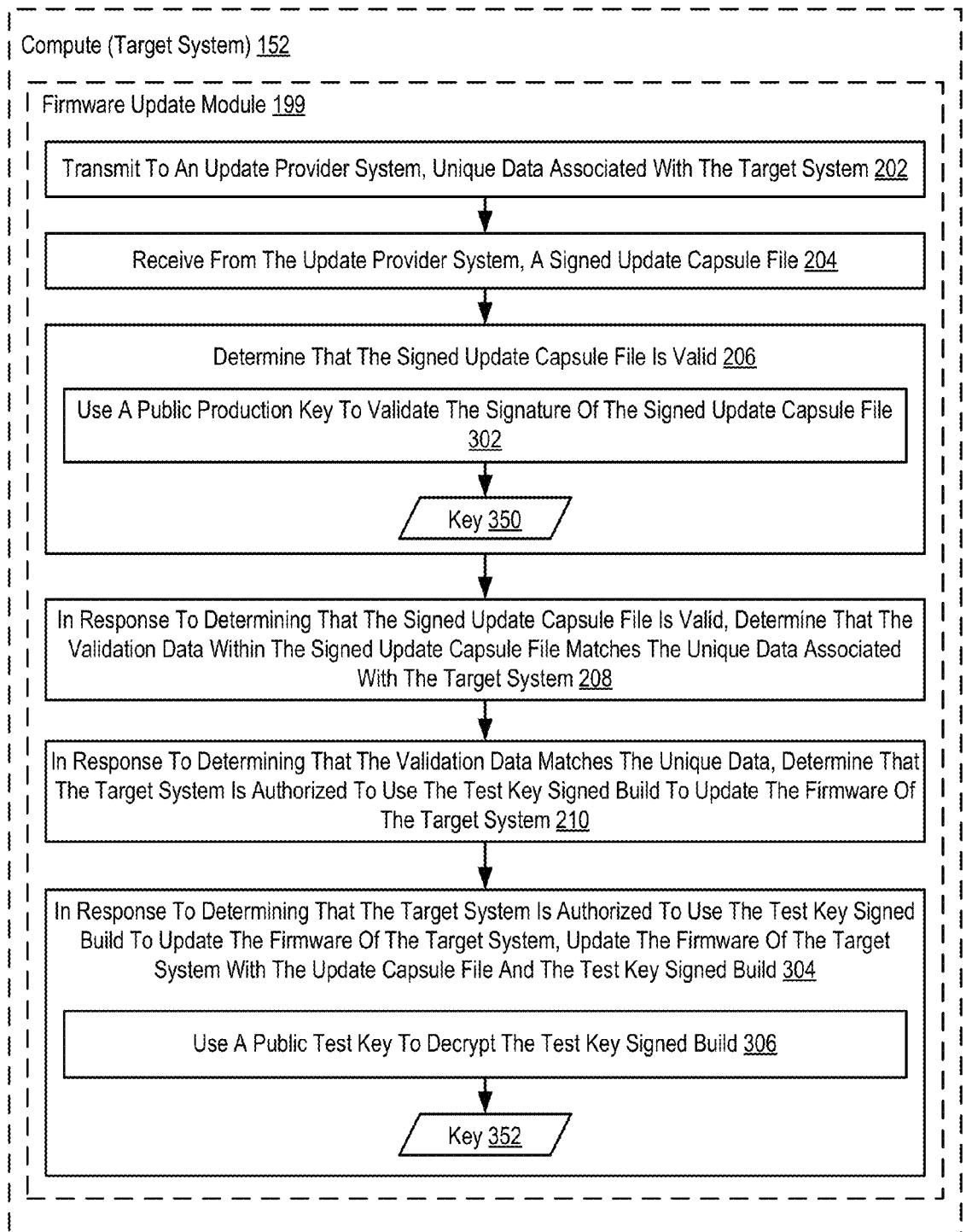
FIG. 3 sets forth a flow chart illustrating a further exemplary method for authorizing use of a test key signed build according to embodiments of the present invention.

For further explanation, FIG. 3 sets forth a flow chart illustrating a further exemplary method for authorizing use of a test key signed build according to embodiments of the present invention. The method of FIG. 3 is similar to the method of FIG. 2 in that the method of FIG. 3 also includes transmitting (202) to an update provider system (182) unique data (250) associated with the target system (152); receiving (204) from the update provider system (182) a signed update capsule file (252); determining (206) that the signed update capsule file (252) is valid; determining (208), in response to determining (206) that the signed update capsule file (252) is valid, that the validation data (256) within the signed update capsule file (252) matches the unique data (250) associated with the target system (152); and determining (210), in response to determining (208) that the validation data (256) matches the unique data (250), that the target system (152) is authorized to use the test key signed build (258) to update the firmware (197) of the target system (152).

In the example of FIG. 3, however, determining (206) that the signed update capsule file (252) is valid includes using (302) a public production key (350) to validate the signature (254) of the signed update capsule file (252). Using (302) a public production key (350) to validate the signature (254) of the signed update capsule file (252) may be carried out by retrieving the public production key from firmware and applying it to the signature.

The method of FIG. 3 includes the target system (152) updating (304), in response to determining (210) that the target system (152) is authorized to use the test key signed build (258) to update the firmware (197) of the target system (152), the firmware (197) of the target system (152) with the signed update capsule file and the test key signed build (258). Updating (304) the firmware (197) of the target system (152) with the test key signed build (258) may be carried out by storing the test key signed build within the firmware (197).

Updating (304) the firmware (197) of the target system (152) with the signed update capsule file and the test key signed build (258) may also include using (306) a public test key (352) to decrypt the test key signed build (258). Using (306) a public test key (352) to decrypt the test key signed build (258) may be carried out by retrieving the public test key from the signed update capsule file and applying it to the test key signed build.

Exemplary embodiments of the present invention are described largely in the context of a fully functional computer system for authorizing use of a test key signed build. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by computer program instructions on a computing system, transmitting to an update provider system, unique data associated with the computing system;
   receiving from the update provider system, a signed update capsule file, the signed update capsule file including:
      a signature for validating the signed update capsule file;
      validation data for comparing with the unique data of the computing system; and
      a public test key for decrypting a test key signed build, wherein the test key signed build is encrypted using a private test key;
   determining that the signature within the signed update capsule file is valid;
   in response to determining that the signature is valid, determining that the validation data within the signed update capsule file matches the unique data associated with the computing system;
   in response to determining that the validation data matches the unique data, transitioning from a use of a production key signed build to the test key signed build; and
   determining that the computing system is authorized to use the test key signed build to update the firmware of the target system.

2. The method of claim 1 wherein determining that the signature within the signed update capsule file is valid includes using a public production key to validate the signature of the signed update capsule file.

3. The method of claim 1 further comprising in response to determining that the computing system is authorized to use the test key signed build to update the firmware of the computing system, updating the firmware of the computing system with the signed update capsule file and the test key signed build.

4. The method of claim 3 wherein updating the firmware of the computing system with signed update capsule file and the test key signed build includes using the public test key to decrypt the test key signed build.

5. The method of claim 1 wherein the signed update capsule file includes a fixed use attribute, the fixed use attribute limiting use of the test key signed build.

6. The method of claim 1 wherein the unique data includes at least one of an Trusted Platform Module (TPM) Endorsement Key (EK), a Machine Serial Number (MSN), and a Machine Type and Model Number (MTM).

7. An apparatus comprising a computer processor and a computer memory operatively coupled to the computer processor, the computer memory having disposed within it computer program instructions that, when executed by the computer processor, cause the apparatus to carry out the steps of:
  transmitting to an update provider system, unique data associated with the computing system;
  receiving from the update provider system, a signed update capsule file, the signed update capsule file including:
    a signature for validating the signed update capsule file;
    validation data for comparing with the unique data of the computing system; and
    a public test key for decrypting a test key signed build, wherein the test key signed build is encrypted using a private test key;
  determining that the signature within the signed update capsule file is valid;
  in response to determining that the signature is valid, determining that the validation data within the signed update capsule file matches the unique data associated with the computing system;
  in response to determining that the validation data matches the unique data, transitioning from a use of a production key signed build to the test key signed build; and
  determining that the computing system is authorized to use the test key signed build to update the firmware of the computing system.

8. The apparatus of claim 7 wherein determining that the signature within the signed update capsule file is valid includes using a public production key to validate the signature of the signed update capsule file.

9. The apparatus of claim 7 further comprising computer program instructions that, when executed by the computer processor, cause the apparatus to carry out the steps of: in response to determining that the computing system is authorized to use the test key signed build to update the firmware of the computing system, updating the firmware of the computing system with the signed update capsule file and the test key signed build.

10. The apparatus of claim 9 wherein updating the firmware of the computing system with the test key signed build includes using the public test key to decrypt the test key signed build.

11. The apparatus of claim 7 wherein the signed update capsule file includes a fixed use attribute, the fixed use attribute limiting use of the test key signed build.

12. The apparatus of claim 7 wherein the unique data includes at least one of an Trusted Platform Module (TPM) Endorsement Key (EK), a Machine Serial Number (MSN), and a Machine Type and Model Number (MTM).

13. A computer program disposed upon a non-transitory computer readable medium, the computer program product comprising computer program instructions that, when executed, cause a computer to carry out the steps of:
  transmitting to an update provider system, unique data associated with the computing system;
  receiving from the update provider system, a signed update capsule file, the signed update capsule file including:
    a signature for validating the signed update capsule file;
    validation data for comparing with the unique data of the computing system; and
    a public test key for decrypting a test key signed build, wherein the test key signed build is encrypted using a private test key;
  determining that the signature within the signed update capsule file is valid;
  in response to determining that the signature is valid, determining that the validation data within the signed update capsule file matches the unique data associated with the computing system;
  in response to determining that the validation data matches the unique data, transitioning from a use of a production key signed build to the test key signed build; and
  determining that the computing system is authorized to use the test key signed build to update the firmware of the computing system.

14. The computer program product of claim 13 wherein determining that the signature within the signed update capsule file is valid includes using a public production key to validate the signature of the signed update capsule file.

15. The computer program product of claim 13 further comprising computer program instructions that, when executed, cause a computer to carry out the steps of: in response to determining that the computing system is authorized to use the test key signed build to update the firmware of the computing system, updating the firmware of the computing system with the signed update capsule file and the test key signed build.

16. The computer program product of claim 15 wherein updating the firmware of the computing system with the signed update capsule file and the test key signed build includes using the public test key to decrypt the test key signed build.

17. The computer program product of claim 13 wherein the signed update capsule file includes a fixed use attribute, the fixed use attribute limiting use of the test key signed build.

18. The computer program product of claim 13 wherein the unique data includes at least one of an Trusted Platform Module (TPM) Endorsement Key (EK), a Machine Serial Number (MSN), and a Machine Type and Model Number (MTM).

19. The computer program product of claim 13 wherein the computer readable medium comprises a storage medium.

* * * * *